(12) United States Patent
Bhargava (10) Patent No.: US 12,468,645 B2
(45) Date of Patent: Nov. 11, 2025

(54) METHODS, SYSTEMS, AND COMPUTER READABLE MEDIA FOR EXPOSING FEATURES OF AN INTERNET OF THINGS (IoT) DEVICE

(71) Applicant: Keysight Technologies, Inc., Santa Rosa, CA (US)

(72) Inventor: Arpit Bhargava, Gurugram (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 147 days.

(21) Appl. No.: 18/233,552

(22) Filed: Aug. 14, 2023

(65) Prior Publication Data

US 2025/0004964 A1 Jan. 2, 2025

(30) Foreign Application Priority Data

Jun. 30, 2023 (IN) .............................. 202311044006

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
CPC .............................. G06F 13/36; G06F 2213/40
See application file for complete search history.

(56) References Cited

U.S. PATENT DOCUMENTS

| | | | |
|---|---|---|---|
| 7,058,164 B1* | 6/2006 | Chan | H04M 3/20 379/265.09 |
| 7,559,065 B1* | 7/2009 | Sosnovsky | G06F 9/542 719/318 |
| 10,944,587 B2 | 3/2021 | Yang et al. | |
| 11,196,742 B2 | 12/2021 | Cai et al. | |
| 2019/0102402 A1* | 4/2019 | Perron | H04L 51/214 |
| 2019/0130405 A1* | 5/2019 | Adams | G06Q 20/405 |
| 2019/0215343 A1* | 7/2019 | Rykowski | H04L 63/205 |
| 2021/0344767 A1* | 11/2021 | Bell | H04L 12/1859 |
| 2021/0349322 A1* | 11/2021 | Harris | G02B 27/0176 |

FOREIGN PATENT DOCUMENTS

EP 4105842 A1 12/2022

OTHER PUBLICATIONS

Alvarez-Campana, et al., "Smart CEI Moncloa: An IoT-based Platform for People Flow and Environmental Monitoring on a Smart University Campus", Sensors, pp. 1-24 (2017).

* cited by examiner

*Primary Examiner* — Eric T Oberly (57) ABSTRACT

Methods, systems, and computer readable media for exposing features of an internet of things (IoT) device are disclosed. One example method for exposing features of an IoT device occurs at an IoT device. The method comprises: concurrently with or after bootup of the IoT device, accessing a definition file comprising one or more entries, wherein each of the one or more entries indicates a subscription event topic and an event handler for handling events associated with the subscription event topic; subscribing, via a message bus environment, to a first subscription event topic indicated by the definition file: receiving a first event message associated with the first subscription event topic; and processing, using a first event handler associated with the first subscription event topic indicated by the definition file, the first event message.

20 Claims, 6 Drawing Sheets

FIG. 1

```
export const subscriptionsVSHandler = {
    { topic: 'senseTemprature', callBack: async (obj: Buffer) => {
        return tempratureService.executeSenseTempratureReq(obj);
    },
    { topic: 'getMeasurement', callBack: async (obj: Buffer) => {
        return measurementService.executeGetMeasurementReq(obj);
    },
    { topic: 'scpi', callBack: async (scpiCommand: Buffer) => { // this will execute SCPI on instrument as IoT device
        return instrumentSCPIEXECService.executeSCPIReq(scpiCommand);
    },
    { topic: 'aggregateLogs', callBack: async (_obj: Buffer) => {
        return logService.executeAggregateLogsReq();
    },
    //..
    // new feature just needs to be added here with corresponding topic with method to be executed on event on that topic
};
```

```
70  for (const subscription of subscriptionsVSHandler) {
71    const testStationGuid = registrationService.getTestStationGuid();
72    const sub = `agent/${testStationGuid}/${subscription.topic}`;
73    logger.info(`unique topic/subject for this particular bootstraped IoT device:${sub}`);
74    logger.info(`subscribed for:${sub}`);
75    this.mqttClient.subscribe(sub);
76  }
```

```
57  export class MQTTMessageHandler {
58    public onMessage(topic: string, payload: Buffer): void {
59      try {
60        logger.info(`MQTT client onMessage topic: ${topic}`);
61        const testStationGuid = registrationService.getTestStationGuid();
62        for (const subscription of subscriptionsVSHandler) {
63          if (topic === `agent/${testStationGuid}/${subscription.topic}`) {
64            // after matching the topic, execute function mapped to that particular topic
65            subscription.callBack(payload);
66            break;
67          }
68        }
69      } catch (error) {
70        logger.error(`MQTT client onMessage error: ${(JSON.stringify(error))}`);
71      }
72    }
73  }
```

METHODS, SYSTEMS, AND COMPUTER READABLE MEDIA FOR EXPOSING FEATURES OF AN INTERNET OF THINGS (IoT) DEVICE

PRIORITY APPLICATION

This application claims the priority benefit of Indian Patent Application No. 202311044006 filed Jun. 30, 2023, the disclosure of which is incorporated herein by reference in its entirety.

TECHNICAL FIELD

The subject matter described herein relates to network communications. More specifically, the subject matter relates to methods, systems, and computer readable media for exposing features of an internet of things (IoT) device.

BACKGROUND

The rapid growth of internet of things (IoT) presents challenges related to the investment cost of IoT device control and the implementation of scalable and maintainable architectures. For example, IoT devices may rely on events (e.g., request messages) for control and may utilize multiple event listeners for handling various events. In this example, where a subscribe/publish architecture is utilized, an IoT device may subscribe to one or more event topics or subjects, and when a user or client publishes an event to a subscribed-to topic or subject at an IoT address associated with the IoT device, the IoT device may process or handle the event by executing a feature, e.g., a service or function. One potential issue with current systems is effective management of both structured and unstructured data in real-time scenarios, while providing an intuitive and/or self-explanatory architecture that allows novices (e.g., new employees) to easily extend functionality and maintain existing IoT products.

To address these challenges, it may be useful to identify the features and use cases that IoT devices will fulfill and provide effective interfaces that enable IoT devices to listen and execute commands over the internet as needed.

SUMMARY

Methods, systems, and computer readable media for exposing features of an internet of things (IoT) device are disclosed. One example method for exposing features of an IoT device occurs at an IoT device. The method comprises: concurrently with or after bootup of the IoT device, accessing a definition file comprising one or more entries, wherein each of the one or more entries indicates a subscription event topic and an event handler for handling events associated with the subscription event topic; subscribing, via a message bus environment, to a first subscription event topic indicated by the definition file; receiving a first event message associated with the first subscription event topic; and processing, using a first event handler associated with the first subscription event topic indicated by the definition file, the first event message.

According to one example system for exposing features of an IoT device, the system comprises a memory, at least one processor, and an IoT device implemented using the memory and the at least one processor. The IoT device is configured for: concurrently with or after bootup of the IoT device, accessing a definition file comprising one or more entries, wherein each of the one or more entries indicates a subscription event topic and an event handler for handling events associated with the subscription event topic; subscribing, via a message bus environment, to a first subscription event topic indicated by the definition file; receiving a first event message associated with the first subscription event topic; and processing, using a first event handler associated with the first subscription event topic indicated by the definition file, the first event message.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the terms "function" and "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for exposing features of an internet of things (IoT) device. Users generally want to control or interact with various IoT devices. When IoT devices are in secured networks (e.g., behind firewalls), these device may not be controlled/reached via HTTPS application programming interfaces (APIs) or REST API calls. To overcome firewall issues, IoT devices may utilize a message bus, event-driven architecture, where the IoT devices establish outward connection to a message bus broker server, thereby allowing incoming event messages to bypass the firewall and be received and processed by the IoT devices. For example, in a message bus, event-driven architecture, IoT devices may rely on events (e.g., event messages or request messages) for control and may utilize multiple event listeners for handling various events. In this example, where a subscribe/publish architecture is utilized, an IoT device may subscribe to one or more event topics or subjects, and when a user or client publishes an event to a subscribed-to topic or subject at an IoT address associated with the IoT device, the IoT device may process or handle the event by executing a feature, e.g., perform a service or execute a function.

In some embodiments, an example architecture in accordance with various aspects described herein can allow IoT devices to expose control and execution functions (e.g., features) to the internet in a reusable and effective manner. For example, a definition file can be created and modified comprising mappings of subscription event topics and event handlers (e.g., functions or methods to be executed when triggered by a relevant event or a related message). In such embodiments, e.g., at or during bootup, an IoT device can use the definition file or related data to subscribe to relevant event topics and utilize corresponding callback functions, thereby reducing technical complexity and other issues that can occur during manually IoT device configuration.

In some embodiments, an example architecture in accordance with various aspects described herein can allow IoT devices to be remotely controlled securely. For example, a definition file can map standard commands for programmable instruments (SCPI) commands or features to be executed. In this example, the mapping of the SCPI command to an event topic and a corresponding callback function can provide a human-understandable layer over the top of SCPI commands, and this layer can be securely exposed to users over the internet.

In accordance with some aspects of the subject matter described herein, techniques, methods, equipment, systems, and/or mechanisms are disclosed for exposing features of an IoT device. For example, an IoT device in accordance with aspects described herein may expose its features to the internet via a server or a related message bus environment. For example, on bootup of each IoT device, supported device actions/features, device information, and a unique identifier (ID) associated with the IoT device may be provided to a central server. In this example, the central server may provide a web browser based graphical UI (GUI) that shows registered available IoT devices using unique IDs or human-friendly names (e.g., provided by users, the IoT devices, or others) and allows users to select or use features from these IoT devices, e.g., by sending or publishing a device-specific event message.

In accordance with some aspects of the subject matter described herein, techniques, methods, equipment, systems, and/or mechanisms are disclosed for exposing features of an IoT device in a generic or reusable format. For example, an example architecture in accordance with various aspects described herein can be used to configure an IoT device to subscribe to relevant event topics and utilize corresponding callback functions via a definition file comprising mappings of subscription event topics and event handlers (e.g., functions or methods to be triggered or called when a particular event or a related message is retrieved or received). In some embodiments, a definition file or related data may be easy to read and modify when new features of an IoT device are added or when existing features are changed, thereby reducing technical complexity and other issues that can occur, e.g., during manual IoT device configuration. For example, a IoT device developers may add a new entry in a definition file for defining new or different feature. In this example, the new entry may indicate the subject or topic (e.g., the subscription event topic name) and a function handler/callback (e.g., a function name that is executed on the targeted device in response to receipt or retrieval of an event associated with the topic). Continuing with this example, since the new entry uses the same syntax or structure, IoT developers can reuse the same generic logic and do not need to write additional code to subscribe to a topic corresponding to the new feature for targeted IoT devices. As such, using this approach, IoT device can be programmed quickly with the new features.

Aspects of the subject matter described herein provide various benefits or advantages over conventional IoT configuration or control systems. For example, advantages of using a definition file or mappings of subscription event topics and event handlers in IoT device setup or configuration include the ability to: expose new features of IoT devices to the internet; allow IoT devices to subscribe to their own events (e.g., using unique topic names based in part on their GUID); provide a modular design to facilitate readability, maintainability, and testability (e.g., business logic is kept as a separate layer from the server communication layer (e.g., the message bus handling layer) and an authorization layer may be added to either layer or kept separate (e.g., an authorization check can be performed per feature communication)); provide flexibility for integrating or exposing third-party libraries or interfaces at the IoT devices; provide scalability (e.g., an event-driven message bus can support thousands of clients and multiple IoT devices even with low resources); and provide security (e.g., IoT device features can be treated differently regarding more security or authentication checks).

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
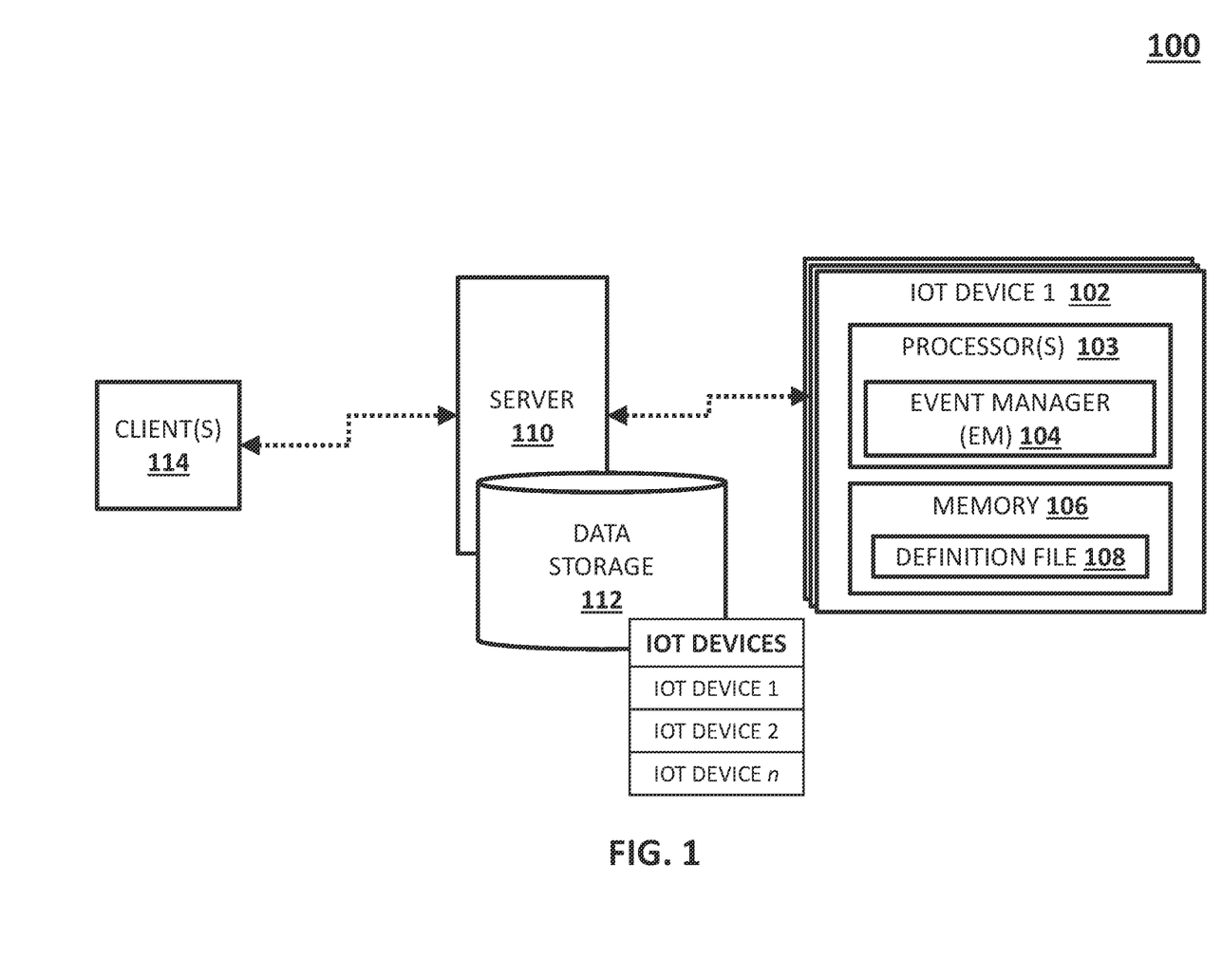
FIG. 1 is a diagram illustrating an example environment for exposing features of an internet of things (IoT) devices.

FIG. 1 is a diagram illustrating example environment 100 for exposing features of IoT devices. Referring to FIG. 1, environment 100 may include IoT devices including IoT device 102, server 110, and client(s) 114. Environment 100 may represent various nodes or devices and may include one or more networks, such as an internal network, a cloud environment, or the internet. For example, client(s) 114 and server 110 may be located in a cloud network or the internet, whereas IoT device 102 may be connected to the internet via a firewall device. In this example, server 110 may act as a proxy for allowing external users, e.g., client(s) 114, to request features or to trigger functions at IoT device 102.

IoT devices, such as IoT device 102, may represent a suitable entity or entities (e.g., users, applications, etc.) for interacting with server 110 and/or for providing features (e.g., data or services) to internet-connected client(s) 114. In some embodiments, IoT devices, such as IoT device 102, may include test stations, test instruments, DUTs, nodes, devices, etc.) for performing various services or functions (e.g., a test function or a calibration function).

IoT devices, such as IoT device 102, may include one or more processor(s) 103 and a memory 106. For example, IoT device 102 may include memory 106 for storing logic or other data and processor(s) 103 for executing an event manager (EM) 104. EM 104 may represent any suitable entity for performing functions associated with managing events, IoT device configuration, or other device capabilities. In some embodiments, EM 104 may also include software used or executed when IoT device 102 is booting up. In such embodiments, EM 104 may be configured for connecting and registering with server 110 and for subscribing to device-specific event topics.

In some embodiments, IoT devices, such as IoT device 102, or EM 104 may utilize a definition file 108 (e.g., stored or located in memory 106) during or around bootup (e.g., an initialization or bootstrap phase). For example, definition file 108 may store entries using a TypeScript array format, a JavaScript object notation (JSON) format, an extensible markup language (XML) format, an object notation format, a data interchange format, or a binary format. In another example, definition file 108 may comprise or represent an array or collection object or related data.

In some embodiments, definition file 108 may comprising one or more entries, wherein each of the one or more entries indicates a subscription event topic and an event handler for handling events associated with the subscription event topic. For example, definition file 108 may indicate a collection of subscription event topics and corresponding callback functions to handle related event request messages. In this example, on bootup, IoT device 102 may subscribe to each of the subscription event topics indicated by definition file 108, e.g., via a MQTT service or another message bus environment. Continuing with this example, when an event request message associated with a particular event topic is received by IoT device 102, IoT device 102 may trigger a callback function indicated by definition file 108 and that corresponds to that event topic.

In some embodiments, IoT devices, such as IoT device 102, or EM 104 may generate and use a GUID for uniquely identifying itself to server 110 and for efficiently subscribing to relevant event topics. For example, during bootup, IoT device 102 may generate a unique ID and register with server 110 using this unique ID, thereby allowing server 110 and other related entities to communicate with IoT device 102. In another example, IoT device 102 may generate and use a GUID for uniquely identifying event topics such that IoT device 102 can subscribe to and receive only relevant feature requests, e.g., event request messages for IoT device 102.

Server 110 may represent a suitable entity or entities (e.g., users, applications, etc.) for interacting with client(s) 114 and/or various IoT devices, e.g., IoT device 102. In some embodiments, server 110 may include a message bus environment service or related entity (e.g., a message broker) for sending events or related messages to appropriate IoT devices or entities therein (e.g., a MQTT client running on IoT device 102).

In some embodiments, server 110 may provide a REST application programming interface (API) or a GUI for allowing client(s) 114 to request features of one or more IoT devices. For example, server 110 may provide a web-based GUI that displays registered IoT devices, including IoT device 102, to client(s) 114 and various features the IoT devices can perform. In this example, client(s) 114 may utilize the GUI to trigger an event request message or may publish an event request message separately, e.g., using information obtained from server 110 or data storage 112.

Client(s) 114 may represent a suitable entity or entities (e.g., users, applications, etc.) for interacting with server 110 and/or for requesting features (e.g., data or services) from IoT devices, e.g., IoT device 102, registered therewith. For example, client 114 may utilize a REST API or a GUI provided by server 110 to select IoT device 102 and trigger an event request message to be sent or published for a feature provided by IoT device 102. In this example, the event request message may indicate the specific topic name that is exclusively associated with IoT device 102 (e.g., a topic name parameter value in the event request message may include the IoT device's unique ID or globally unique ID (GUID)).

It will be appreciated that FIG. 1 is for illustrative purposes and that various nodes and/or modules, locations, and/or functionality described above in relation to FIG. 1 may be changed, altered, added, or removed. For example, some entities described above or aspects thereof may be combined or integrated into a single platform, device, or entity.

Figure 2:
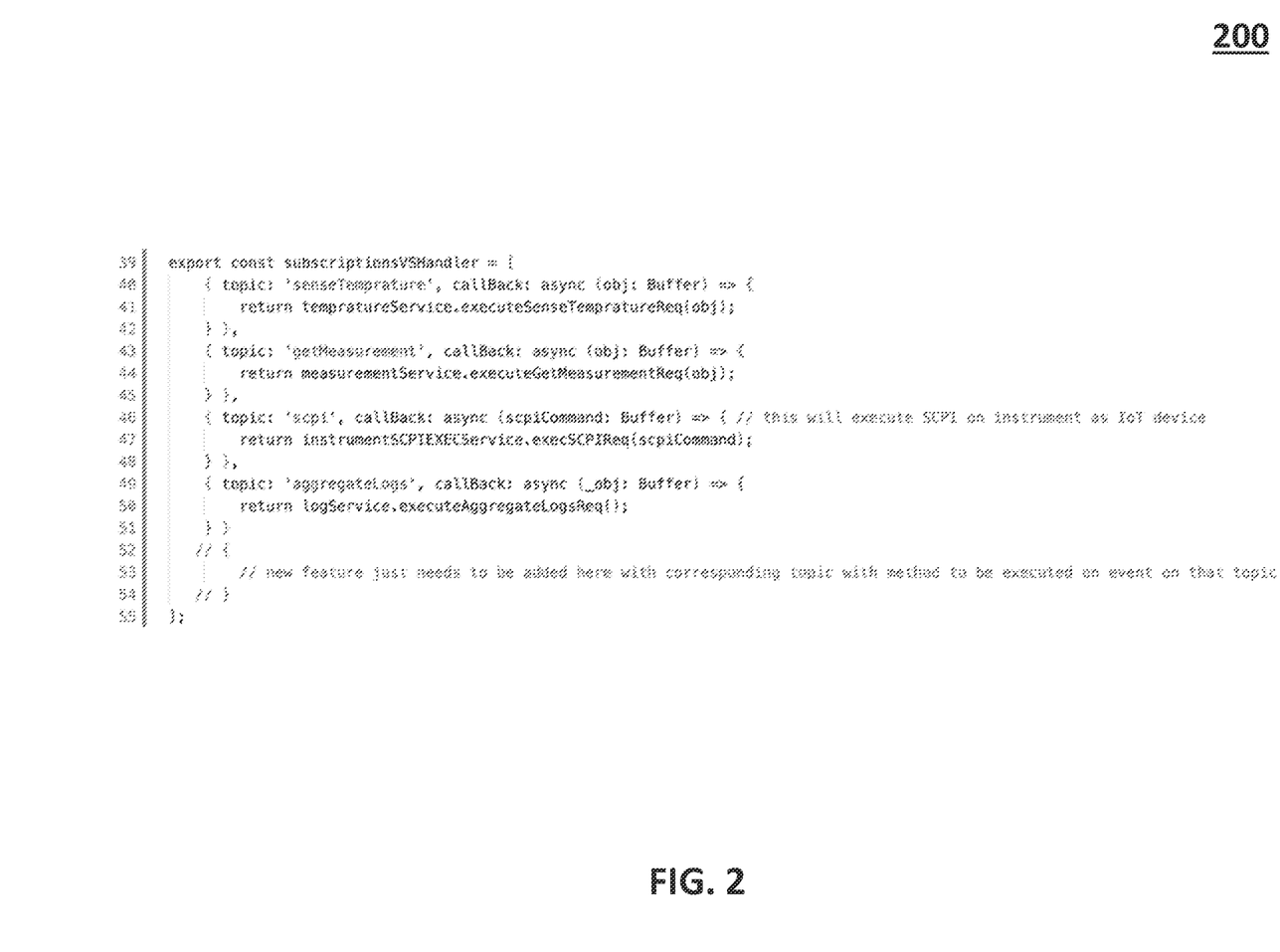
FIG. 2 is a diagram illustrating example code usable for defining an array object indicating event topics and corresponding event handler functions.

FIG. 2 is a diagram illustrating example code 200 usable for defining an array object indicating event topics and corresponding event handler functions. In some embodiments, code 200 or related logic may be stored in memory 106 or a data store accessible to IoT device 102. In such embodiments, code 200 or related logic may be executed during or after a bootup phase (e.g., an initialization phase) of IoT device 102.

In some embodiments, code 200 may represent definition file 108 or a portion thereof and may indicate supported features, e.g., in the form of topics/subjects and what function(s) to execute in response retrieving a request for that particular feature. For example, code 200 may include or indicate an array in a JSON format or a JavaScript or TypeScript programming language. In another example, code 200 or definition file 108 may contain or indicate mappings of subscription event topics and event handlers (e.g., a function or method to be executed when triggered by a relevant event or a related message) for IoT device 102.

In some embodiments, code 200 or definition file 108 may be preloaded or may be received from server 110 or another entity (e.g., a network operator). In some embodiments, code 200 or definition file 108 may be modified when a new feature is introduced. For example, a network operator an IoT device operator may add a feature by adding a mapping indicating a new subscription event topic and a corresponding event handler to an array or data structure.

Referring to FIG. 2, code 200 is written in TypeScript and defines an array called "subscriptionsVSHandler" as a constant using the "const" keyword. The array consists of multiple objects, each representing a subscription topic and its corresponding callback function. In lines 40-42, code 200 refers to an object with a "topic" property set to 'senseTemprature' and a "callBack" property representing an asynchronous function for executing a request related to temperature sensing using a "tempratureService.executeSenseTempratureReq" method. In lines 43-45, code 200 refers to object with a "topic" property set to 'getMeasurement' and a "callBack" property representing an asynchronous function for executing a request to obtain measurements using a "measurementService.executeGetMeasurementReq" method. In lines 46-48, code 200 refers to an object with a "topic" property set to 'scpi' and a corresponding callback function for executing a standard commands for programmable instruments (SCPI) command on IoT device 102 (e.g., a measurement instrument or a test instrument) using "instrumentSCPIEXECService.execSCPIReq" method. In lines 49-51, code 200 refers to an object with a "topic" property set to 'aggregatelogs' and a corresponding callback function for executing a request to aggregate logs using a "logService.executeAggregatelogsReq" method. In lines 52-54, code 200 includes a commented-out section indicating that new features can be added by including additional objects in the array, with their corresponding topic and method to be executed on that topic.

It will be appreciated that code 200 in FIG. 2 is for illustrative purposes and that different and/or additional code may be utilized for indicating event topics and corresponding event handler functions. Further, it will be appreciated that logic, data, or operations defined in code 200 may be expressed in various programming languages or data formats.

Figure 3:
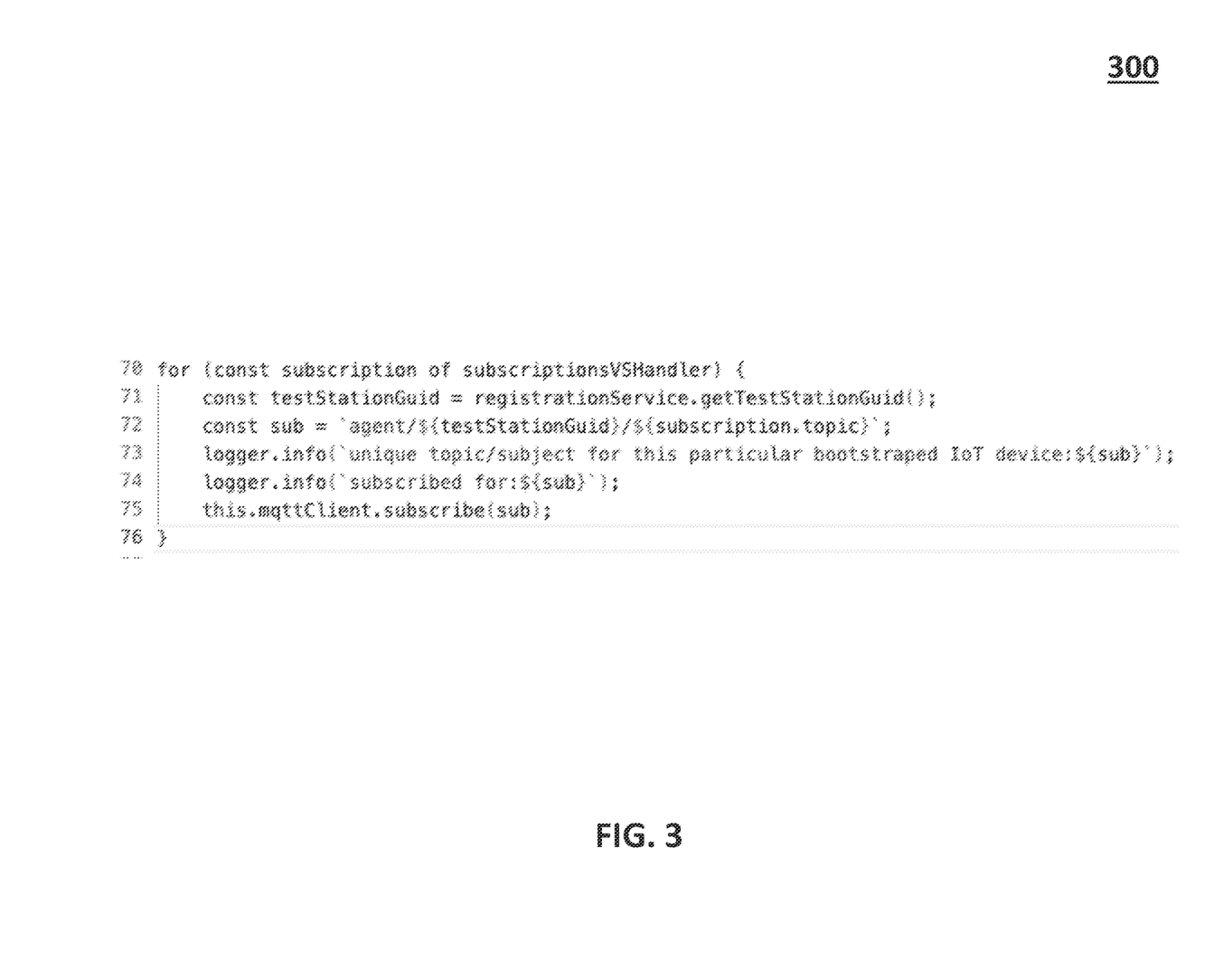
FIG. 3 is a diagram illustrating example code usable for subscribing to event topics indicated in an array object.

FIG. 3 is a diagram illustrating example code 300 usable for subscribing to event topics indicated in an array object. In some embodiments, code 300 or related logic may be stored in memory 106 or a data store accessible to IoT device 102. In such embodiments, code 300 or related definition logic may be executed during or after a bootup or bootstrap phase (e.g., an initialization phase) of IoT device 102.

In some embodiments, a bootup or bootstrap phase may include an initial setup and configuration process that IoT device 102 undergoes when it is first powered on. For example, a bootup or bootstrap phase may involve procedures and operations for establishing network connectivity or other functions associated with normal operations. In this example, during this phase, IoT device 102 may perform several actions to establish its identity, connectivity, and operational parameters.

In some embodiments, IoT device 102, EM 104, or another entity may utilize code 300 to subscribe to a set of subscription event topics indicated by definition file 108 or code 200. For example, by executing code 300 during or after a bootup phase, IoT device 102, EM 104, or another entity may ensure various features are supported or exposed on IoT device 102. In this example, when IoT device 102 boots up, IoT device 102 connects to a message bus service (e.g., via server 110) and executes code 300, thereby subscribing to events indicated in definition file 108 (e.g., the "subscriptionsVSHandler" array or JSON variable of code 200).

Referring to FIG. 3, code 300 indicates logic for performing a loop to iterate over each subscription over a collection of subscriptions, generating a unique topic name for each device based on a test station's globally unique identifier (GUID) and a subscription event topic, logging information about the topic, and subscribing the test station (e.g., IoT device 102) to that topic using a message queuing telemetry transport (MQTT) client, e.g., running on IoT device 102.

In line 71, code 300 indicates that a "getTestStationGuid" function or method from a "registrationService" object is called to retrieve a test station (e.g., IoT device 102) GUID and that the GUID is stored in a "testStationGuid" variable. In line 72, code 300 indicates a new variable named "sub" is defined which is a string containing a concatenation of the words "agent/", the testStationGuid, and the value of a "topic" property of a subscription object, thereby creating a unique event topic or subject for each bootstrapped IoT device. In line 73, code 300 indicates that a logger.info( ) function is called to log a message indicating the value of the "sub" variable. This log statement helps in tracking and identifying the specific topic or subject associated with each IoT device. In line 74, code 300 indicates that a logger.info( ) function is called to log a message indicating that IoT device 102 has been subscribed to a specific topic, e.g., the value of the "sub" variable. In line 75, code 300 indicates that an "mqttClient.subscribe" function is called to subscribe IoT device 102 to the topic represented by the "sub" variable. This allows IoT device 102 to receive messages or data related to that unique topic.

In some embodiments, since code 300 utilizes a loop to iterate over the array or collection of subscriptions indicated by definition file 108, the number of subscriptions indicated in definition file 108 does not necessitate changing or modifying code 300, e.g., because the names or numbers of subscriptions are not hardcoded. For example, once a new feature (e.g., a subscription event topic) is added to definition file 108 or a related "subscriptionsVSHandler" array, code 300 can be executed for subscribing to the new feature along with any of other defined features.

It will be appreciated that code 300 in FIG. 3 is for illustrative purposes and that different and/or additional code may be utilized for subscribing to event topics or events. Further, it will be appreciated that logic, data, or operations defined in code 300 may be expressed in various programming languages or data formats.

Figure 4:
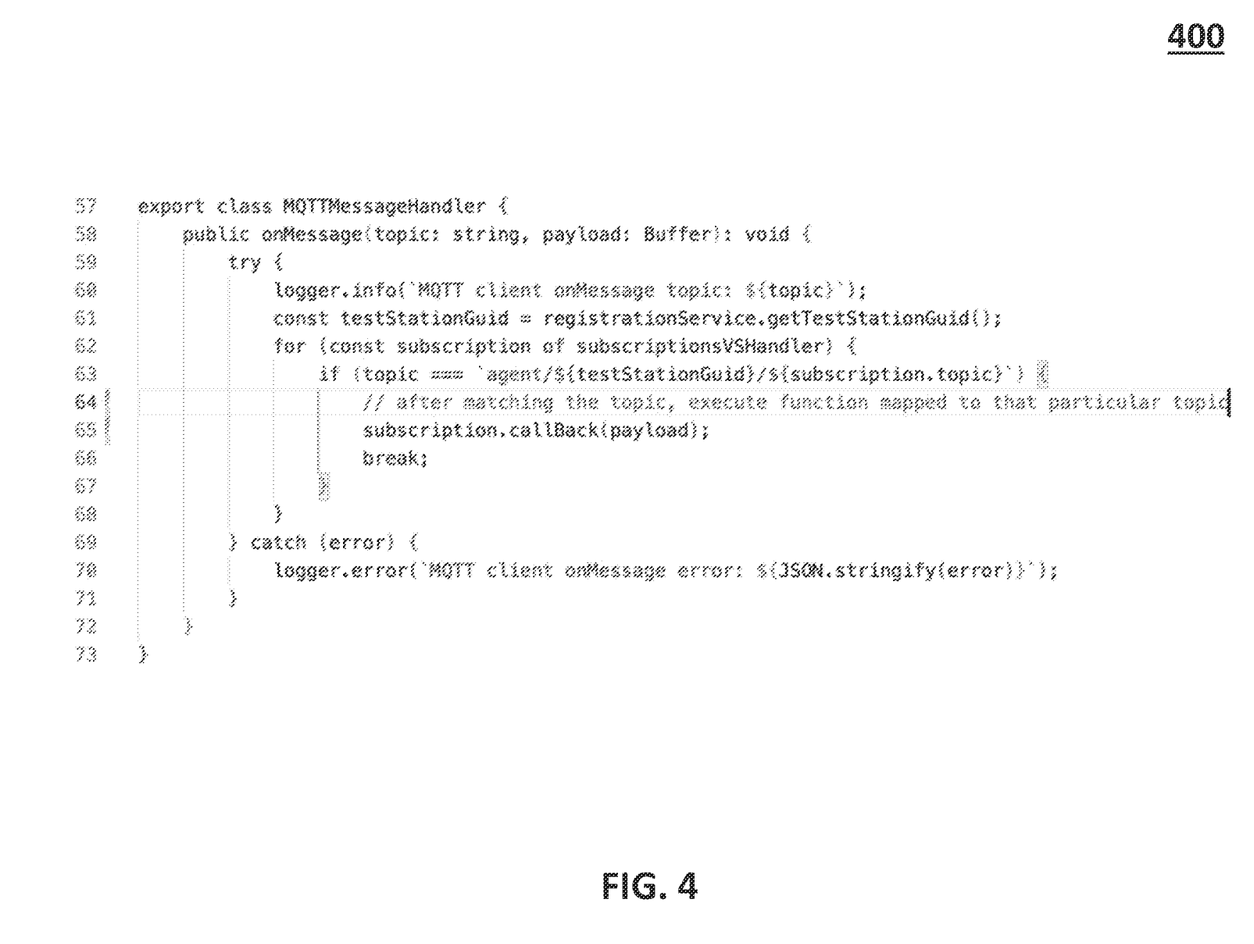
FIG. 4 is a diagram illustrating example code usable for handling a message queuing telemetry transport (MQTT) message associated with a particular event topic.

FIG. 4 is a diagram illustrating example code 400 usable for handling an MQTT message associated with a particular event topic. In some embodiments, code 400 or related logic may be stored in memory 106 or a data store accessible to IoT device 102. In such embodiments, code 400 or related definition logic may be executed during or after a bootup or bootstrap phase (e.g., an initialization phase) of IoT device 102.

In some embodiments, IoT device 102, EM 104, or another entity may utilize code 400 for handling messages associated with subscribed-to event topics. For example, code 400 or related logic may include MQTT message handling functionality for event topics that are unique to IoT device 102. In this example, since IoT device 102, EM 104, or another entity subscribes to topic names that include the GUID of IoT device 102 (which IoT device 102 generated and used during registration or subscription with server 110 during bootup), only events (e.g., request messages) for features of IoT device 102 will need to be processed or handled.

In some embodiments, IoT device 102, EM 104, or another entity may utilize code 400 or related logic that can generically handle features defined in definition file 108 by executing a particular function or callback function for each particular topic. In such embodiments, the function to be executed for a given subscription event topic is auto-resolved and called based on data in definition file 108 or a related "subscriptionsVSHandler" array or collection. For example, assume client 114 wants to sense temperature on IoT device 102 and IoT device 102 or related entity has already subscribed to that topic during its bootup, code 400 or related logic may handle a related event message, e.g., by matching this particular topic's full "senseTemprature" string (including the IoT device's GUID) and then executing the appropriate callback function (e.g., business logic), e.g., an "executeSenseTempratureReq" function where the payload is the input object.

Referring to FIG. 4, code 400 defines an "MQTTMessageHandler" class that includes a public method named "onMessage". This method takes two parameters: "topic", which is a string representing the topic of the received MQTT message, and "payload", which is a buffer data type containing message data. In the "onMessage" method (lines 58-72), a try-catch block is used to handle any potential errors that might occur during the execution of the method. If an error is caught, it is logged using a logger, along with a JSON string representation of the error.

In line 61, code 400 indicates that a "getTestStationGuid" function or method from a "registrationService" object is called to retrieve a test station (e.g., IoT device 102) GUID and that the GUID is stored in a "testStationGuid" variable. In lines 62-67, code 400 indicates a loop is used to iterate over each item in a collection named subscriptionsVSHandler. Each item in this collection represents a subscription with a specific event topic and a corresponding callback function. Within the loop (line 63), code 400 indicates that the received topic is checked to see if it matches a unique topic value in the format of 'agent/${testStationGuid}/${subscription.topic}'. In line 65, code 400 indicates that if there is a match, a callback function associated with that subscription is executed by passing the payload as an argument. In line 66, code 400 indicates that after a matching topic is found and processed the loop is terminated using a break statement.

It will be appreciated that code 400 in FIG. 4 is for illustrative purposes and that different and/or additional code may be utilized for handling an MQTT message or another message. Further, it will be appreciated that logic, data, or operations defined in code 400 may be expressed in various programming languages or data formats.

Figure 5:
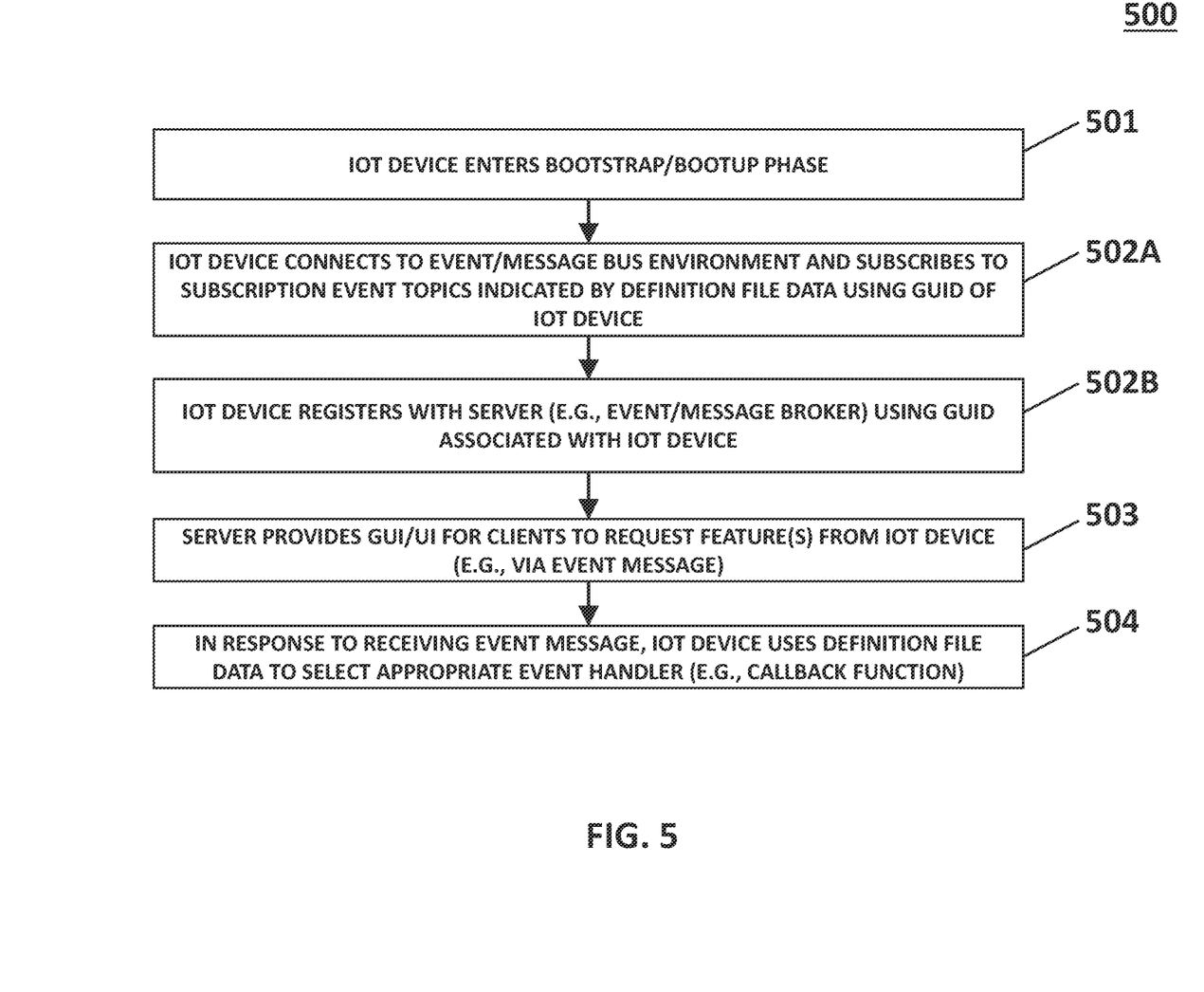
FIG. 5 is a diagram illustrating an IoT device architecture for exposing features.

FIG. 5 is a diagram 500 illustrating an IoT device architecture for exposing features. Referring to diagram 500, in step 501, IoT device 102 may enter a bootup or a bootstrap phase. For example, when IoT device 102 bootups (e.g., after receiving power or after a restart), IoT device 102 may enter an initial configuration phase for obtaining internet connectivity and starting various processes for performing services, features, and/or related functions.

In step 502A, IoT device 102 or a related entity (e.g., EM 104) may connect to an event or message bus environment (e.g., a MQTT service provided via server 110) and subscribe to various subscription event topics indicated by data from definition file 108 (e.g., the "subscriptionsVSHandler" array or JSON variable of code 200). For example, definition file 108 may be an XML file and may be accessed and read by IoT device 102 (e.g., during or soon after its bootup) to initialize an array or collection object for various functions or related event handling logic. In this example, IoT device 102 or EM 104 may utilize logic to iterate over the collection object and, for each subscription item, the logic may retrieve the GUID identifying IoT device 102 and subscribe to an IoT device-specific subscription event topic name that is exclusively associated with IoT device 102 (e.g., the subscribed-to topic name may include the IoT device's GUID along with the topic name of the subscription item).

In step 502B (which may happen concurrently with or before step 502A), IoT device 102 or a related entity (e.g., EM 104) may use its GUID for identifying itself when registering with server 110. For example, server 110 may act as an internet-accessible event or related message broker, where various IoT devices, including IoT device 102, registers with server 110, thereby allowing clients 114 to publish event messages for IoT device 102 (or another registered IoT device) to handle (e.g., IoT device 102 may perform a requested service or action and then provide a response message for the requester).

In step 503, server 110 may provide a GUI or other user interface for allowing clients 114 to publish an event or a related message for requesting features or services provided by IoT device 102 and may then provide the event or related message to IoT device 102, e.g., via the event or message bus environment. For example, server 110 may provide a GUI showing all available or registered IoT devices, including IoT device 102, and displaying their respective features. In this example, clients 114 or another entity may use the GUI to trigger or generate an event message for IoT device 102.

In step 504, in response to receiving an event message (e.g., a request message for a feature or service provided from IoT device 102), IoT device 102 or a related entity (e.g., EM 104) may utilize data from definition file 108 (e.g., the "subscriptionsVSHandler" array or JSON variable of code 200) to make sure a topic name associated with the received event or related message matches a subscribed-to topic name (e.g., a topic name exclusive to IoT device 102) and, if a match is found, execute a corresponding callback function for performing business logic, e.g., logic or function that performs a device feature like temperature sensing, measurement taking, logging, etc.

For example, IoT device 102 may act as a MQTT client and may utilize an "OnMessage" function for handling a received event message. In this example, the "OnMessage" function may include a "for" loop to iterate over a collection object defined by or in definition file 108 and, for each subscription item, the logic may include an if statement to determine whether the topic name of the received event message (e.g., "agent/IoTDevice234235/SenseTemprature' matches a device-specific version of topic name of one of the subscription item in the collection object (e.g., the device-specific version includes the device's GUID (e.g., "IoTDevice234235" and the topic name "SenseTenprature" of the subscription item). Continuing with the example, if the if statement is true for a given subscription item, the logic may call or trigger a function (e.g., "tempratureService.executeSenseTempratureReq") associated with the subscription item and provide the payload of the received event message as input to the function.

It will be appreciated that aspects and functions described in FIG. 5 are for illustrative purposes and that different and/or additional aspects and functions may be utilized to expose features of an IoT device.

Figure 6:
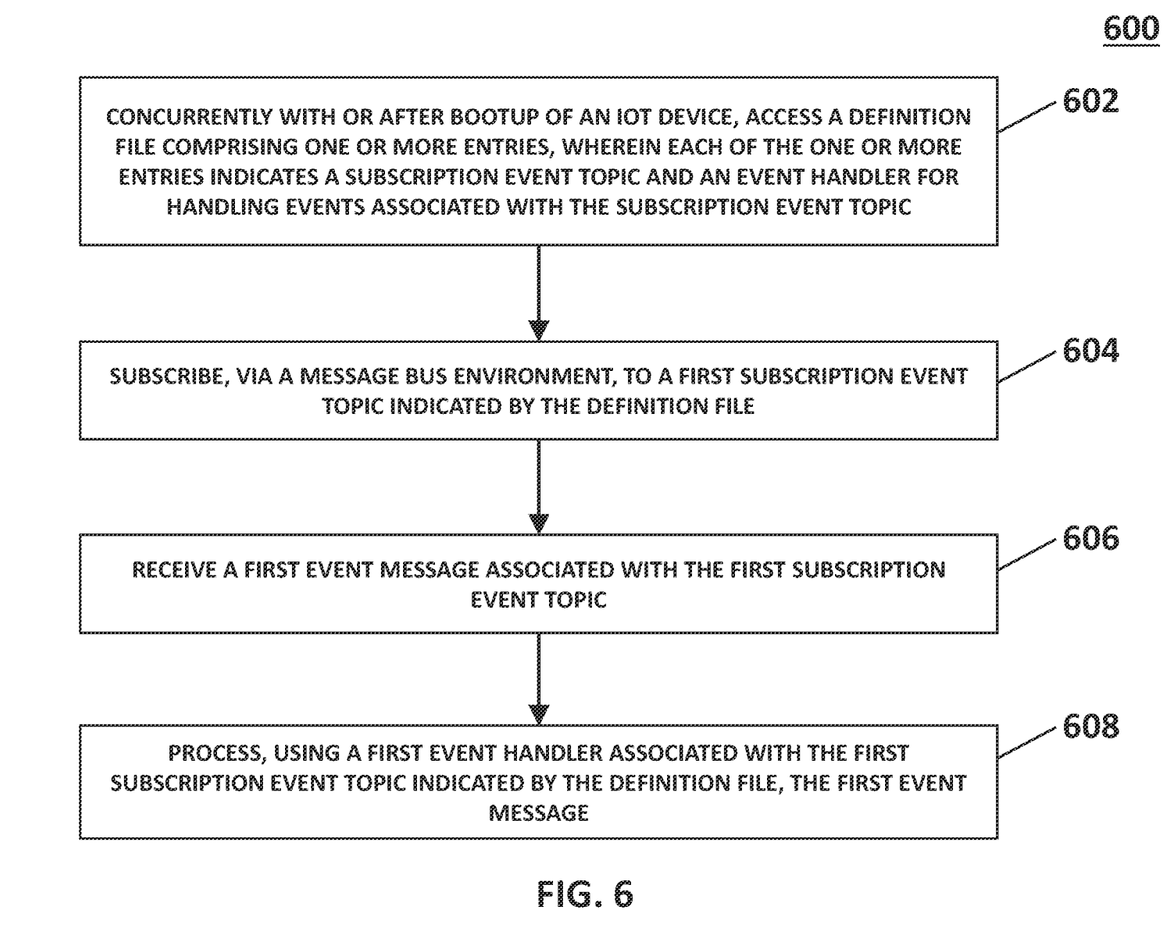
FIG. 6 is a block diagram illustrating an example process for exposing features of an IoT device.

FIG. 6 is a block diagram illustrating an example process 600 for exposing features of IoT device 102. In some embodiments, example process 600 may include steps 602, 604, 606, and/or 608. In some embodiments, process 600, or portions thereof, may be performed by IoT device 102, EM 104, and/or another node or module.

Referring to FIG. 6, in step 602, concurrently with or after bootup of the IoT device, a definition file (e.g., definition file 108) comprising one or more entries may be accessed. In some embodiments, each entry of a definition file may indicate a subscription event topic and an event handler for handling events associated with the subscription event topic.

In some embodiments, a definition file may store entries using a TypeScript array format, a JavaScript object notation (JSON) format, an extensible markup language (XML) format, an object notation format, a data interchange format, or a binary format.

In some embodiments, concurrently with or after the bootup, IoT device 102 may generate a first global unique identifier (GUID) and uses the first GUID when IoT device 102 communicates with server 110 for registering itself or subscribing to a first subscription event topic.

In step 604, a first subscription event topic indicated by the definition file may be subscribed to via a message bus environment. For example, IoT device 102 or EM 104 may subscribed to a subscription event topic by sending a subscription message to server 110. In this example, server 110 and IoT device 102 may act as nodes that communicate using a message bus protocol, e.g., MQTT, AMQP, WebSockets, etc.

In some embodiments, a message bus environment may include a message queuing telemetry transport (MQTT) environment, an advanced message queuing protocol (AMQP) environment, an Apache Kafka environment, a constrained application protocol (CoAP) environment, a NATS messaging system environment, or a WebSockets environment.

In step 606, a first event message associated with the first subscription event topic may be received. For example, client 114 may send or publish a request message (e.g., an MQTT request message) associated with a subscription event topic to server 112 and server 112 or a related entity (e.g., message broker therein) may send a first event message (e.g., the request message or a related message) indicating a first event to IoT device 102.

In some embodiments, a first event message may include a request message that may be addressed to the first GUID, may be destined for IoT device 102, or may be directed to a class or type of IoT devices of which IoT device 102 may be a member.

In step 608, the first event message may be processed using a first event handler associated with the first subscription event topic indicated by the definition file. For example, when a first event message associated with a particular subscription event topic is received, IoT device 102 may execute a particular function or method associated with handling messages associated with that subscription event topic.

In some embodiments, a first event handler may utilize a first function or callback function for performing business logic associated with a first event message and optionally an authentication or authorization process prior to utilizing the first function or callback function.

In some embodiments, IoT device 102 may be configured for receiving a modified definition file comprising an additional entry indicating a second subscription event topic and a second event handler for handling events associated with the second subscription event topic.

In some embodiments, in response to a reboot of IoT device 102 or in response to IoT device 102 detecting that a definition file has been modified, IoT device 102 may be configured for subscribing, via the message bus environment (e.g., an MQTT system), a second subscription event topic indicated by the definition file; receiving a second event message associated with the second subscription event topic; and processing, using a second event handler associated with the second subscription event topic indicated by the definition file, the second event message.

In some embodiments, server 110 or a related entity (e.g., a message broker) provides a user interface for searching or viewing available features provided by IoT device.

It will be appreciated that process 600 is for illustrative purposes and that different and/or additional actions may be used. It will also be appreciated that various actions described herein may occur in a different order or sequence.

It should be noted that IoT device 102, EM 104, server 110, and/or various modules, nodes, or functionality described herein may constitute a special purpose computing platform, device, or system. For example, IoT device 102 or server 110 may be a network appliance or node configured to perform various aspects described herein. Further, IoT device 102, EM 104, server 110, or functionality described herein can improve the technological field of network communications by providing various techniques, systems, methods, or mechanisms for exposing features of IoT devices, e.g., by providing an architecture or related mechanisms for adding or modifying IoT device features via a definition file or related data structure that is accessed by an IoT device at or soon after bootup.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for exposing features of an internet of things (IoT) device, the method comprising:
   at an internet of things (IoT) device comprising a test instrument located behind a firewall:
   concurrently with or after bootup of the IoT device, accessing a definition file comprising one or more entries, wherein each of the one or more entries indicates a subscription event topic and an event handler for handling events associated with the subscription event topic;
   subscribing, via a message bus environment and with a message bus broker server accessible by clients, to a first subscription event topic indicated by the definition file;
   receiving, from the message bus broker server and in a manner that bypasses the firewall, a first event message associated with the first subscription event topic and generated by the message bus broker server in response to a request from one of the clients to trigger a function of the IoT device; and
   processing, using a first event handler associated with the first subscription event topic indicated by the definition file, the first event message and triggering the function of the IoT device.

2. The method of claim 1 comprising:
   receiving a modified definition file comprising an additional entry indicating a second subscription event topic and a second event handler for handling events associated with the second subscription event topic.

3. The method of claim 2 comprising:
   in response to a reboot of the IoT device or in response to the IoT device detecting that the definition file has been modified:
   subscribing, via the message bus environment, the second subscription event topic indicated by the definition file;
   receiving a second event message associated with the second subscription event topic; and
   processing, using a second event handler associated with the second subscription event topic indicated by the definition file, the second event message.

4. The method of claim 1 wherein concurrently with or after the bootup, the IoT device generates a first global unique identifier (GUID) and uses the first GUID when the IoT device communicates with the message bus broker server for registering the IoT device or subscribing to the first subscription event topic.

5. The method of claim 4 wherein the first event message includes a request message that is addressed to the first GUID, is destined for the IoT device, or is directed to a class or type of IoT devices of which the IoT device is a member.

6. The method of claim 4 wherein the message bus broker server or the message provides a user interface for searching or viewing available features provided by the IoT device.

7. The method of claim 1 wherein the first event handler utilizes a first function or callback function for performing business logic associated with the first event message and optionally an authentication or authorization process prior to utilizing the first function or callback function.

8. The method of claim 1 wherein the definition file stores the entries using a TypeScript array format, a JavaScript object notation (JSON) format, an extensible markup language (XML) format, an object notation format, a data interchange format, or a binary format.

9. The method of claim 1 wherein the message bus environment includes a message queuing telemetry transport (MQTT) environment, an advanced message queuing protocol (AMQP) environment, an Apache Kafka environment, a constrained application protocol (CoAP) environment, a NATS messaging system environment, or a WebSockets environment.

10. A system for exposing features of an internet of things (IoT) device, the system comprising:
a memory;
at least one processor; and
an internet of things (IoT) device comprising a test instrument located behind a firewall, the IoT device being implemented using the memory and the at least one processor, the IoT device configured for:
concurrently with or after bootup of the IoT device, accessing a definition file comprising one or more entries, wherein each of the one or more entries indicates a subscription event topic and an event handler for handling events associated with the subscription event topic;
subscribing, via a message bus environment and with a message bus broker server accessible by clients, to a first subscription event topic indicated by the definition file;
receiving, from the message bus broker server and in a manner that bypasses the firewall, a first event message associated with the first subscription event topic and generated by the message bus broker server in response to a request from one of the clients to trigger a function of the IoT device; and
processing, using a first event handler associated with the first subscription event topic indicated by the definition file, the first event message and triggering the function of the IoT device.

11. The system of claim 10 wherein the IoT device is configured for:
receiving a modified definition file comprising an additional entry indicating a second subscription event topic and a second event handler for handling events associated with the second subscription event topic.

12. The system of claim 11 wherein the IoT device is configured for:
in response to a reboot of the IoT device or in response to the IoT device detecting that the definition file has been modified:
subscribing, via the message bus environment, the second subscription event topic indicated by the definition file;
receiving a second event message associated with the second subscription event topic; and
processing, using a second event handler associated with the second subscription event topic indicated by the definition file, the second event message.

13. The system of claim 10 wherein the IoT device is configured for:
concurrently with or after the bootup, generating a first global unique identifier (GUID); and
using the first GUID when the IoT device communicates with the message bus broker server for registering the IoT device or subscribing to the first subscription event topic.

14. The system of claim 13 wherein the first event message includes a request message that is addressed to the first GUID, is destined for the IoT device, or is directed to a class or type of IoT devices of which the IoT device is a member.

15. The system of claim 13 wherein the message bus broker server provides a user interface for searching or viewing available features provided by the IoT device.

16. The system of claim 10 wherein the first event handler utilizes a first function or callback function for performing business logic associated with the first event message and optionally an authentication or authorization process prior to the first function or callback function.

17. The system of claim 10 wherein the first event handler utilizes an initial authentication or authorization process and after the authentication or authorization process is successful, a first function or callback function is called for performing business logic associated with the first event message.

18. The system of claim 10 wherein the definition file stores the entries using a TypeScript array format, a JavaScript object notation (JSON) format, an extensible markup language (XML) format, an object notation format, a data interchange format, or a binary format.

19. The system of claim 10 wherein the message bus environment includes a message queuing telemetry transport (MQTT) environment, an advanced message queuing protocol (AMQP) environment, an Apache Kafka environment, a constrained application protocol (CoAP) environment, a NATS messaging system environment, or a WebSockets environment.

20. A non-transitory computer readable medium comprising computer executable instructions embodied in the non-transitory computer readable medium that when executed by a processor of a computer perform steps comprising:
at an internet of things (IoT) device comprising a test instrument located behind a firewall:
concurrently with or after bootup of the IoT device, accessing a definition file comprising one or more entries, wherein each of the one or more entries indicates a subscription event topic and an event handler for handling events associated with the subscription event topic;
subscribing, via a message bus environment and with a message bus broker server accessible by clients, to a first subscription event topic indicated by the definition file;
receiving, from the message bus broker server and in a manner that bypasses the firewall, a first event message associated with the first subscription event topic and generated by the message bus broker server in response to a request from one of the clients to trigger a function of the IoT device; and
processing, using a first event handler associated with the first subscription event topic indicated by the definition file, the first event message and triggering the function of the IoT device.

* * * * *